May 8, 1951            C. G. ODDY            2,551,695
TRACK FOR TRACKLAYING VEHICLES
Filed Sept. 10, 1949
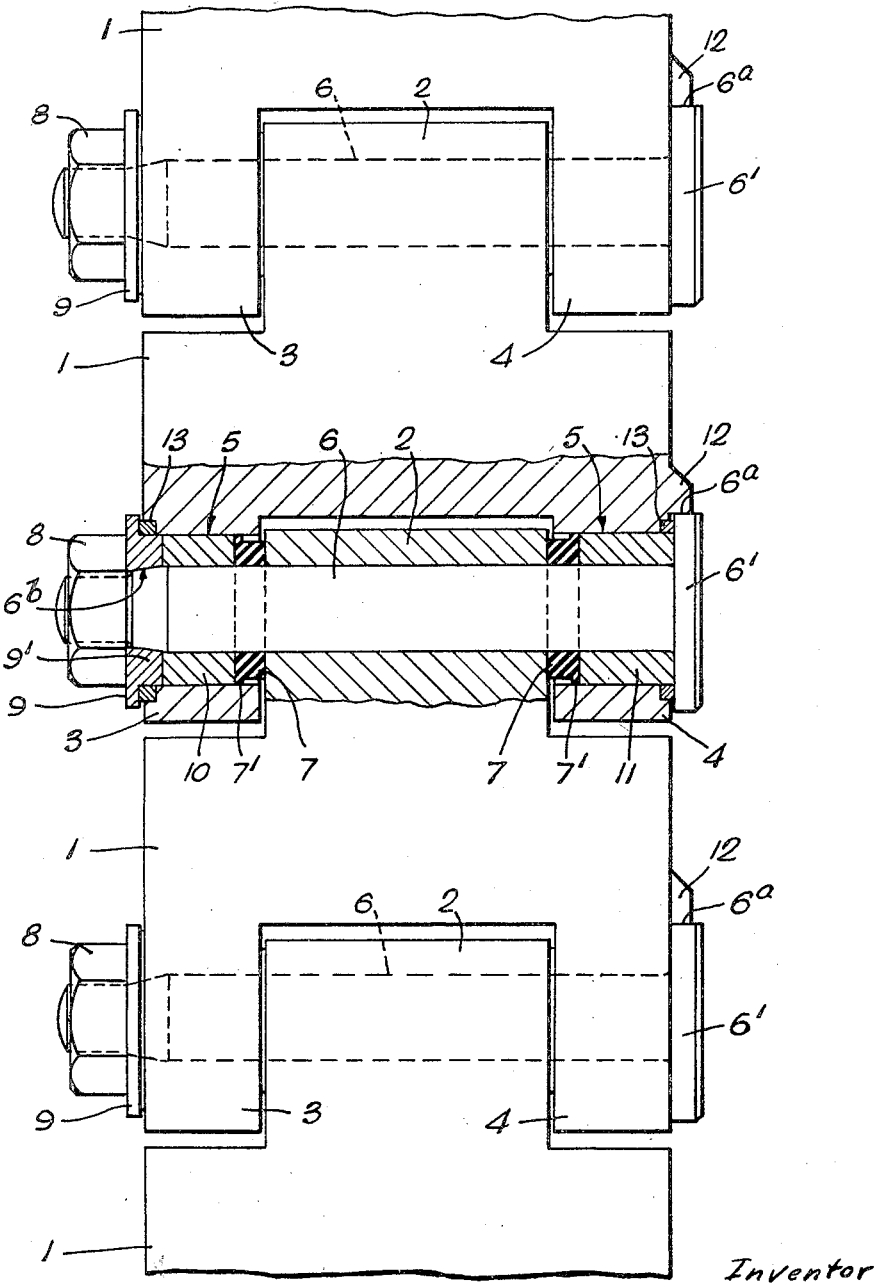
Inventor
Clifford Grayson Oddy
by: Haseltine, Lake & Co.
Agents Patented May 8, 1951

2,551,695

UNITED STATES PATENT OFFICE 2,551,695

TRACK FOR TRACK LAYING VEHICLES

Clifford Grayson Oddy, London, England, assignor to Vickers-Armstrong Limited, London, England, a British company Application September 10, 1949, Serial No. 115,021
In Great Britain October 7, 1948

10 Claims. (Cl. 305—2)

This invention relates to the construction of tracks for track laying vehicles in which interengaged links are pivotally connected together by bolts or connecting pins passed through the lugs or bosses and jaws provided on the ends of the links, and in which the bearing surfaces of the connecting pins or bolts are hermetically sealed against the entry of dirt and water by axially compressed sealing rings.

Usually, the sealing rings are composed of rubber, or material in which rubber predominates, and in order to effectively seal the oscillating pin joint, these rings have to be compressed axially to approximately 200 lbs. per square inch. Hitherto, this has been effected by using connecting links on each side of the track link proper, the sealing rings being clamped between the outer faces of the link and the inner faces of the appropriate connecting links. This method involves using two pins for each joint of each track link, and also the use of the connecting links introduces undesirable additional material for maintenance and adds to the cost of production. The object of the present invention is to obviate these disadvantages.

According to the present invention the sealing rings for each joint of the track abut against lateral faces of one of the links and are disposed about the bolt or connecting pin and within bores in jaws of the other link which receive between them the first mentioned link, axially movable annular abutments being fitted in said bores and being interposed between a head on one end of the bolt or connecting pin, and securing means affixed to the other end of the bolt or pin.

In an embodiment of the invention which is illustrated by the accompanying part sectional plan drawing, each link 1 of the track has at one end a boss 2 and at the other end is bifurcated or formed with a pair of jaws 3 and 4, the bosses fitting in the appropriate jaws in the track assembly, the jaws and bosses being bored as at 5 for the reception of the pin or bolt 6 of the joint, the bores 5 of the jaws having fitted therein annular rubber sealing rings 7 abutting against the side faces of the appropriate boss 2, one end of the pin or bolt having threaded thereon a nut 8 engaging a stout metallic washer 9 having a concentric boss-like part 9' engaging in the outer end of the bore 5 of the appropriate jaw, an axially movable annular bush 10 being interposed between this washer and the associated sealing ring, the bore of the other of the two jaws receiving the pivot pin or bolt 6 also containing an axially movable annular bush 11 having a greater axial dimension than the aforesaid bush 10 and interposed between the head 6' of the pin or bolt and the associated sealing ring 7, means, such as a flat 6a on the head 6' mating with a lug 12 provided on the adjacent jaw 4, being provided to prevent rotation of the bolt relative to the jaws 3 and 4, so that the boss 2 has a journal fit on the bolt 6, this keying or locking of the bolt to the jaws 4 also facilitating tightening of the nut.

The bores 5 in the jaws 3 and 4 are provided with axially movable annular bushes 10 and 11 respectively in order to enable rubber sealing rings 7 to be assembled between the mating faces of the boss 2 and the jaws 3 and 4 the bores 5 in the jaws 3 and 4 are bored out to the same diameter as the diameter of a flange 7' integral with the outer face or end of each rubber ring 7. Thus, each of the bores 5 is occupied by a sealing ring 7 and an axially movable close fitting annular bush centering the connecting pin 6.

After the headed connecting pin or bolt 6 has been inserted the bushes 10 and 11 are squeezed inwards by tightening up the nut 8 threaded on to the bolt, thus clamping the sealing rings 7 between the inner faces of the bushes 10 and 11 and the faces of the boss 2 to the desired pressure.

Entry of moisture and grit behind the pin head 6' and washer 9 is prevented by providing rubber sealing rings or washers 13 between the outer surfaces of the jaws and the pin head and aforesaid washer respectively. These outer sealing rings may take the form of washers or rings of rubber, soft metal, or other suitable material. By reason of the aforesaid keying or locking of the bolt there is avoided the wear of the washers 13 which would arise if there were relative rotation between the bolt and the jaws 3 and 4.

Finally, in order to effect a seal between the pin 6 and the inner diameter of the washer 9, a short taper 6b is provided on the end of the pin and a mating taper provided in the washer so that when the sealing rings have been compressed to the required amount the washer is forced tightly on to the taper on the pin. The taper on the pin also provides a medium for facilitating assembly of the pin through the various washers and bushes.

I claim:

1. A track for a track laying vehicle wherein each link of the track has at one end a boss and at the other end is bifurcated or formed with a pair of jaws, the bosses fitting in the appropriate jaws in the track assembly, the jaws and bosses being bored to accommodate the pin or bolt of the joint axially movable annular bushes fitted on the pin or bolt, the bores of the jaws having fitted therein annular rubber sealing rings abutting against the side faces of the appropriate boss, one end of the pin or belt having threaded thereon a nut engaging a metal washer having a concentric boss-like part engaging in the outer end of the bore of the appropriate jaw, one of said annular bushes being interposed between this washer and the associated sealing ring, the other bush being interposed between the head of the pin or bolt and the associated sealing ring, means being provided to prevent rotation of the bolt during tightening or removal of the nut.

2. A joint assembly for links of a track for a track laying vehicle according to claim 1 wherein the bush engaged by the head of the bolt has an axial dimension greater than the other bush.

3. A joint assembly for links of a track for a track laying vehicle according to claim 1 wherein each sealing ring has at one end an external annular flange fitting closely in the appropriate bore.

4. A hinge connection for hingedly connected links of an endless track for a track laying vehicle, comprising a connecting bolt, jaws on one link receiving between them a part of another link, co-axial bores in the said part and jaws receiving said bolt, the bore of said part forming a bearing surface in which is journalled said bolt, axially compressed sealing rings disposed about the bolt and hermetically sealing said bores against the entry of dirt and water, a nut threaded on said bolt, the sealing rings being pressed axially against lateral faces of said part of one of the links by compression action of the nut, axially movable annular metallic bushes fitted on the bolt and located in said bores in said jaws such compression action being applied to said sealing rings through the medium of said bushes so that there is a positive axial compression of the said sealing rings between opposed non-resilient surfaces, additional sealing rings located at the outer ends of said bores in the jaws and also compressed by the said compression action due to threading the nut on to the bolt or pin, the said bushes and first mentioned sealing rings being removable through said bores.

5. A hinge connection according to claim 4 wherein said additional sealing rings are located between normally relatively non-rotatable compression applying surfaces.

6. A joint assembly for links of a track for a track laying vehicle according to claim 5 wherein each of the first mentioned sealing rings has an external annular flange dimensioned to fit closely in the appropriate bore.

7. In a pivoted link track for a track laying vehicle the provision with each link of the track at one end thereof of a boss and at the other end thereof of a pair of jaws, each boss fitting in the appropriate pair of jaws in the track assembly, co-axial borings in each pair of jaws and associated boss, a pivot bolt passed through said bores, the bore of the said boss having a journal fit with the pivot bolt, sealing rings, axially slidable bushes fitted in the bores of the jaws between opposed or inner annular faces of which bushes and the side faces of the boss are compressed said sealing rings, said sealing rings also being engaged in said bores of the jaws, a nut threaded on to one end of the bolt by the positive threading-on action of which nut the total axial compression of said sealing rings is obtained, a metallic washer on the bolt, said nut engaging said washer in a concentric integral boss-like part on said washer engaging in the outer end of the bore of the jaw adjacent said nut, one of said annular bushes being interposed between this washer and the associated sealing ring, the other bush being interposed between the head of the bolt and the associated sealing ring, annular seatings in the outer faces of said jaws, additional sealing rings compressed in said seatings by said washer and the head of the bolt, and means to prevent rotation of the bolt relative to said jaws.

8. A joint assembly for links of a track for a track laying vehicle according to claim 7 wherein the bush engaged by the head of the bolt has an axial dimension greater than the other bush and the said concentric boss-like part of the said washer abuts against the bush having the shorter axial dimension.

9. A joint assembly for links of a track for a track laying vehicle according to claim 8 wherein one of said additional sealing rings embraces the said concentric part of the washer.

10. A joint assembly for links of a track for a track laying vehicle according to claim 8 wherein one of said additional sealing rings embraces the said bush having the greater axial dimension.

CLIFFORD GRAYSON ODDY.

REFERENCES CITED

The following references are of record in the file of this patent:

UNITED STATES PATENTS

| Number | Name | Date |
| --- | --- | --- |
| 1,973,214 | Lamb | Sept. 11, 1934 |
| 2,342,675 | Knox | Feb. 29, 1944 |